United States Patent
Levisse et al.

(10) Patent No.: US 11,754,342 B2
(45) Date of Patent: Sep. 12, 2023

(54) BYPASS AIR/FLUID HEAT EXCHANGER, METHOD FOR MANUFACTURING SAME AND TURBOFAN ENGINE PROVIDED WITH SUCH EXCHANGER

(71) Applicant: SAFRAN AIRCRAFT ENGINES, Paris (FR)

(72) Inventors: Paul Ghislain Albert Levisse, Moissy-Cramayel (FR); Pierre Jean-Baptiste Metge, Moissy-Cramayel (FR); Alexandre Corsaut, Moissy-Cramayel (FR); Catherine Pikovsky, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 180 days.

(21) Appl. No.: 17/604,233

(22) PCT Filed: Apr. 14, 2020

(86) PCT No.: PCT/EP2020/060449
§ 371 (c)(1),
(2) Date: Oct. 15, 2021

(87) PCT Pub. No.: WO2020/212340
PCT Pub. Date: Oct. 22, 2020

(65) Prior Publication Data
US 2022/0205726 A1 Jun. 30, 2022

(30) Foreign Application Priority Data
Apr. 17, 2019 (FR) .................................. FR1904100

(51) Int. Cl.
*F28D 7/00* (2006.01)
*F02C 7/14* (2006.01)
(Continued)

(52) U.S. Cl.
CPC ................ *F28D 7/005* (2013.01); *F02C 7/14* (2013.01); *F02K 3/115* (2013.01); *F28F 1/26* (2013.01);
(Continued)

(58) Field of Classification Search
None
See application file for complete search history.

(56) References Cited

U.S. PATENT DOCUMENTS

| 4,914,904 A * | 4/1990 | Parnes .................... F01D 9/065 |
| | | 60/39.08 |
| 10,982,914 B2 * | 4/2021 | Glickman ............. F28D 1/0443 |

(Continued)

FOREIGN PATENT DOCUMENTS

FR        3028021 B1     3/2019

*Primary Examiner* — Shafiq Mian
(74) *Attorney, Agent, or Firm* — Birch, Stewart, Kolasch & Birch, LLP

(57) ABSTRACT

The present invention relates to a bypass air/fluid heat exchanger (2) for a turbofan engine. According to the invention, this exchanger (2) comprises: —an annular outer shroud (3) with two walls, an inner wall (32) and an outer wall (31), —an annular inner shroud (4) concentric with the outer shroud (3), —a series of OGV guide vanes (5) which connect said outer shroud to said inner shroud, —and a circulation circuit (6) for circulating said fluid, the two shrouds delimiting a bypass air flow path, the fluid circulation circuit (6) is formed in the body of the outer shroud (3) and in the body of at least one of the OGV guide vanes (5), this circulation circuit (6) opening at the two respective ends thereof into an inlet opening (34) and into an outlet opening (35), formed through said outer wall (31) of the outer shroud, and the two shrouds (3, 4), the OGV guide vanes (5) and the circulation circuit (6) of said fluid are integral.

11 Claims, 10 Drawing Sheets

(51) Int. Cl.
  *F02K 3/115* (2006.01)
  *F28F 1/26* (2006.01)
  *F28F 3/12* (2006.01)
  *F28D 21/00* (2006.01)

(52) U.S. Cl.
  CPC .......... *F28F 3/12* (2013.01); *F05D 2260/213* (2013.01); *F28D 2021/0021* (2013.01); *F28D 2021/0049* (2013.01)

(56) References Cited

U.S. PATENT DOCUMENTS

| | | | |
|---|---|---|---|
| 11,203,975 B2* | 12/2021 | Bond | F02C 7/141 |
| 2008/0095611 A1* | 4/2008 | Storage | F28F 1/022 |
| | | | 415/116 |
| 2018/0238640 A1* | 8/2018 | Luschek | F04D 29/526 |
| 2020/0393200 A1* | 12/2020 | Lin | F28D 7/1676 |

* cited by examiner

BYPASS AIR/FLUID HEAT EXCHANGER, METHOD FOR MANUFACTURING SAME AND TURBOFAN ENGINE PROVIDED WITH SUCH EXCHANGER

FIELD OF THE INVENTION

This invention relates to a secondary air/fluid heat exchanger for a bypass turbomachine, one such turbomachine equipped with this exchanger and the method for manufacturing this exchanger.

PRIOR ART

As a reminder, the structure of a bypass turbomachine will be briefly recalled, with reference to the attached FIG. 1.

On this figure can be seen a bypass, twin spool turbomachine 1 with successively, in the direction of circulation of the air, i.e. from upstream (on the left on the figure) to the downstream (on the right on the figure), an air intake 10 and a fan 11, which outputs the air on the one hand in a primary air path 12 and on the other hand in a secondary air path 13. The term "air path" is understood to mean the volume through which an air flow circulates.

The longitudinal axis of the turbomachine is referenced X-X'.

The air flow circulating in the primary air path 12 successively traverses a low-pressure compressor 14a, a high-pressure compressor 14b, a combustion chamber 15, a high-pressure turbine 16a and a low-pressure turbine 16b.

Moreover, the secondary air flow that circulates in the secondary air path 13 is expelled separately through a secondary flow nozzle, after traversing a series of OGV guide vanes 17, (OGV meaning Outlet Guide Vanes). In a turbomachine, the rotating shafts are supported by ball or roller bearings. These bearings must be cooled with lubrication oil to maintain their mechanical integrity since they must not be exposed to temperatures above 150° C. As a consequence, the oil that comes out hot after passing through the bearing must be cooled before being able to be sent again through this bearing.

There are currently two methods to cool the oil in a turbomachine. According to a first method, the fuel of the turbomachine is used as a heat exchange fluid with the oil. Then the hot oil is sent into an oil/fuel exchanger, to cool the oil. According to a second method, the oil is sent into an air/oil exchanger at the level of one of the cold flows of the engine, to cool it. From the document FR 3 028 021 is thus known a heat exchanger comprising a device equipped with movable panels, which is intended to be attached to the inner face of the outer casing delimiting the secondary air path of a turbomachine.

This heat exchanger is thus set at the level of the reference A of FIG. 1, i.e. near the secondary flow nozzle.

However, the trend in turbomachine specifications is toward increasing the rotation speeds and powers involved, which leads to an increase in the requirement for cooling of the lubrication oil. It is therefore necessary to cool a larger volume of oil or further improve its cooling and to do this on engines (turbomachines) that are already extremely limited in terms of overall dimensions and mass.

Furthermore, the introduction of a heat exchanger must not cause any deleterious effects on the aerodynamics of the turbomachine. Existing air/oil exchangers have significant radial and azimuthal overall dimensions and it would therefore be desirable to further improve their incorporation into the turbomachine.

From the document U.S. Pat. No. 4,914,904 is also known a secondary air/lubrication oil heat exchanger, which comprises an outer ring with a double wall, an inner ring, a series of vanes connecting said outer ring to said inner ring and a circuit for circulating the lubrication oil to be cooled.

However, the inlet and outlet orifices of the oil circulating circuit are disposed on the vanes, which makes them hard to access and can even disrupt the aerodynamics of the turbomachine. In addition, the different components of this exchanger are not integral, which makes it necessary to assemble them, leading to an increase of the overall weight.

SUMMARY OF THE INVENTION

The invention thus has the aim of making provision for an air/oil heat exchanger (and more generally air/fluid, this fluid being able to be any fluid to be cooled circulating inside the turbomachine), which:
  can be inserted into the restricted space of a turbomachine,
  does not significantly increase the weight thereof, and
  does not disrupt the flow of air inside the turbomachine.

For this purpose, the invention relates to a secondary air/fluid heat exchanger for a bypass turbomachine.

In accordance with the invention, this heat exchanger comprises:
  an outer ring, annular, with two walls, respectively known as "inner" and "outer",
  an inner ring, annular, concentric with the outer ring,
  a series of OGV guide vanes connecting said outer ring to said inner ring,
  and a circuit for circulating said fluid,
  the two rings delimit a secondary air path, said fluid-circulating circuit is formed in the thickness of said outer ring between its inner wall and its outer wall and in the thickness of at least one of said OGV guide vanes, this circulating circuit opening at both its respective ends into an inlet orifice and into an outlet orifice, formed through said outer wall of the outer ring, and the two rings, the OGV guide vanes and the circulating circuit of said fluid are integral, the heat exchange taking place between said fluid and the secondary air circulating in the secondary air path.

Owing to these features of the invention, this exchanger can be inserted instead and in place of a part of the outer casing delimiting the secondary air path, of the OGV guide vanes and of the forward fairing between the primary and secondary air flows of a turbomachine, since its outer ring, its inner ring and the guide vanes make it possible to channel the secondary flow. In addition, since the circuit for circulating the fluid to be cooled is formed directly into the thickness of the outer ring and of the guide vanes, this makes it possible to integrate it into a restricted environment and to combine the function of guiding the secondary air flow and of cooling the fluid.

This direct incorporation of the fluid-circulating circuit inside the elements directing the secondary air flow makes it possible not to increase the volume and weight of the heat exchanger and hence even that of the turbomachine, and to not disrupt the circulation of the secondary air flow.

Finally, the integral nature of the different parts of this exchanger simplifies its manufacture and also reduces its weight.

According to other advantageous and non-limiting features of the invention, taken alone or in combination:
  the heat exchanger comprises a plurality of cooling tabs which protrude from the inner wall of the outer ring in the direction of the inner ring, over only a part of the distance between this inner wall and the inner ring, these cooling tabs being disposed over at least a portion of the circumference of said inner wall, between the OGV guide vanes and said cooling tabs are integral with said inner wall of the outer ring;

at least one of said OGV guide vanes has two partitions, respectively called "first partition" and "second partition" which meet at their respective upstream ends and at their respective downstream ends, an intermediate separator protrudes between these two partitions from the outer wall of the outer ring, this intermediate separator extending from the respective upstream ends of the first partition and of the second partition all the way to their respective downstream ends and over a height less than that of said partitions, in such a way as to form a chicane which makes it possible to guide the flow of fluid circulating in the circulating circuit from a first space located between the inner wall and the outer wall of the outer ring, upstream of said OGV guide vane, toward a second space fashioned between the first partition, and the intermediate separator, then toward a third space fashioned between the intermediate separator and the second partition and finally toward another part of the first space located between the inner wall and the outer wall of the outer ring, downstream of this same OGV guide vane, with respect to the direction of circulation of the fluid in said circulating circuit of said fluid and this intermediate separator is integral with the outer wall of the outer ring;

the first partition and the second partition of the OGV guide vanes and the intermediate separator are curved with respect to the axial direction of the exchanger;

the heat exchanger comprises at least a first so-called "depowdering" hole fashioned in the intermediate separator at the level of the junction point of this intermediate separator with the outer wall of the outer ring and the respective upstream ends of the first partition and of the second partition of the OGV guide vane and at least a second so-called "depowdering" hole fashioned in the intermediate separator at the level of the junction point of this intermediate separator with the outer wall of the outer ring and the respective downstream ends of the first partition and of the second partition of the OGV guide vane;

the cooling tabs are curved in the axial direction according to the same profile as the two partitions of the OGV guide vanes;

the heat exchanger comprises an annular forward fairing, integral with the circular upstream end of the inner ring and intended to separate the secondary air flow and a primary air flow circulating in said bypass turbomachine and said forward fairing is hollow and delimits a fourth space constituting a portion of the fluid-circulating circuit;

the two upstream and downstream ends of the outer ring are folded back toward the outside of the exchanger in such a way as to form an upstream attachment flange and a downstream attachment flange;

the fluid is lubrication oil.

The invention also relates to a bypass turbomachine. In accordance with the invention, this one comprises a secondary air/fluid heat exchanger as mentioned above, the outer ring and the inner ring of this heat exchanger are respectively attached to an outer casing and to an inner casing of said turbomachine which together delimit the secondary flow path of said bypass turbomachine and the inlet orifice and the outlet orifice of the fluid-circulating circuit are connected to a source of fluid to be cooled of said turbomachine.

The invention finally relates to the method for manufacturing the aforementioned secondary air/fluid heat exchanger. According to this method, this air/fluid heat exchanger is manufactured by additive manufacturing by powder-bed laser fusion.

DESCRIPTION OF THE FIGURES

Other features, aims and advantages of the invention will become apparent from the following description, which is purely illustrative and non-limiting, and which must be read with reference to the appended drawings wherein.

On all the figures, similar elements bear identical references.

DETAILED DESCRIPTION OF THE INVENTION

The air/fluid heat exchanger 2, in accordance with the invention, will now be described in more detail. It is intended to be mounted on the turbomachine 1, at the level of the reference B in this same figure, i.e. instead and in place of a part of the outer casing 18 delimiting the secondary air path and of the OGV guide vanes.

Figure 2:
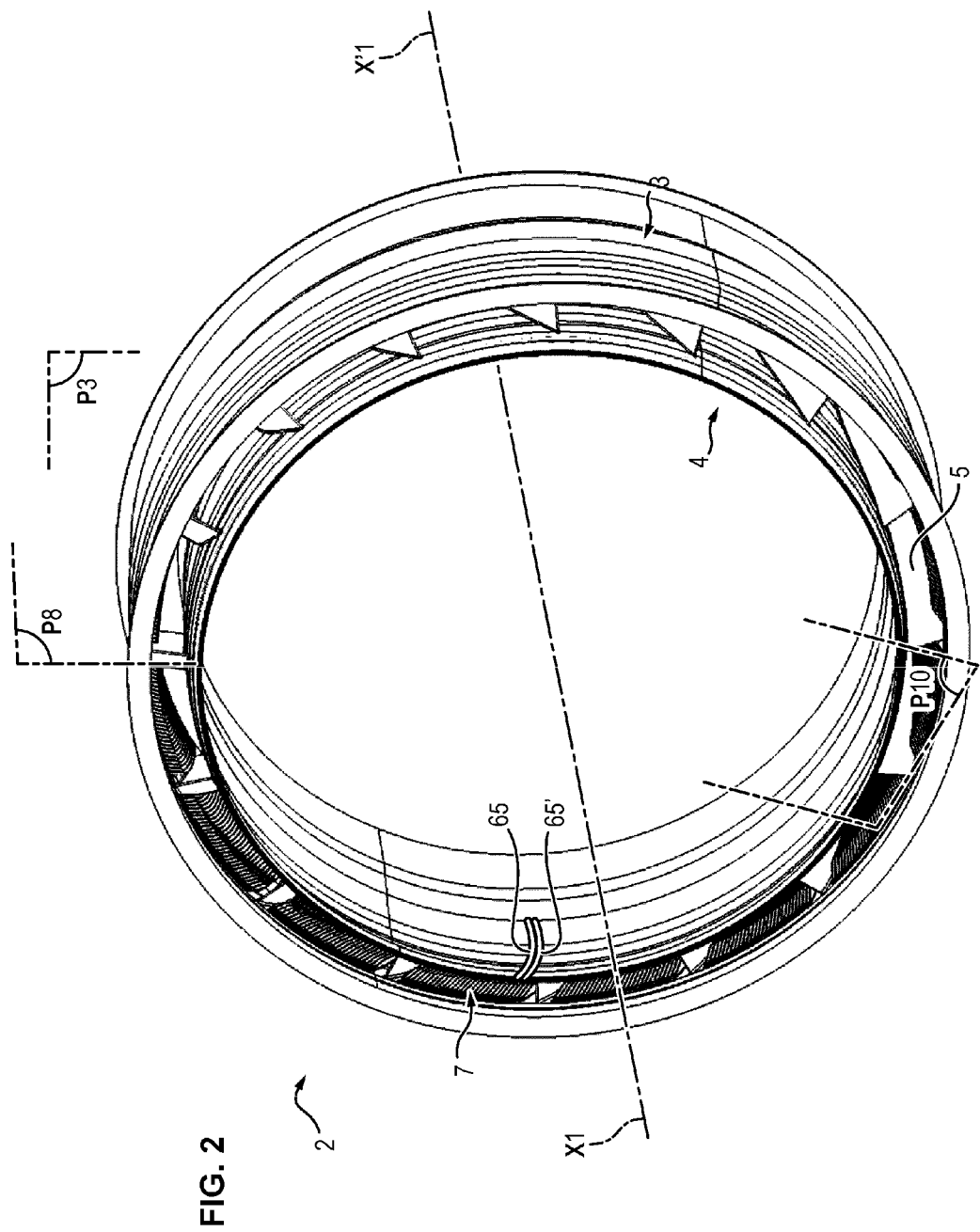
FIG. 2 is a perspective view of the heat exchanger in accordance with the invention.

In FIG. 2, it can be seen that the heat exchanger 2 comprises an outer ring 3, an inner ring 4 and a series of arms 5 playing the role of OGV guide vanes. In the rest of the description and claims, these arms 5 will be named "OGV guide vanes".

Advantageously, this heat exchanger also comprises a forward fairing between the primary and secondary air flows.

More precisely, the outer ring 3 and the inner ring 4 are annular, coaxial and concentric of longitudinal axis X1-X'1, which merges with the longitudinal axis X-X' of the turbomachine 1 when the heat exchanger 2 is in place. The two rings 3 and 4 being concentric, the inner ring 4 of smaller diameter is disposed inside the outer ring 3. The OGV guide vanes 5 interconnect the outer ring 3 and the inner ring 4 and have a role of structural retainment of these rings. These vanes 5 extend along a radial or substantially radial direction.

Figure 3:
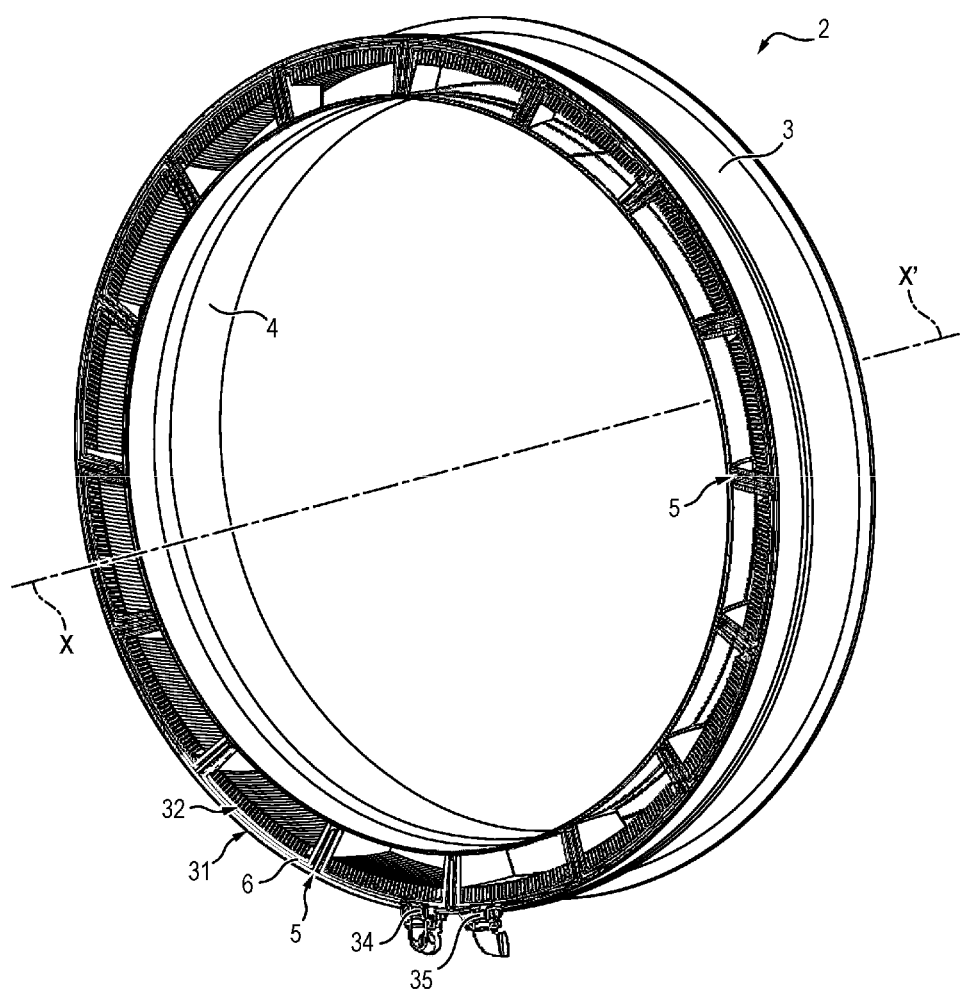
FIG. 3 is a transverse section view of this same exchanger, taken along the plane embodied by the indication P3 in FIG. 2.
Figure 4:
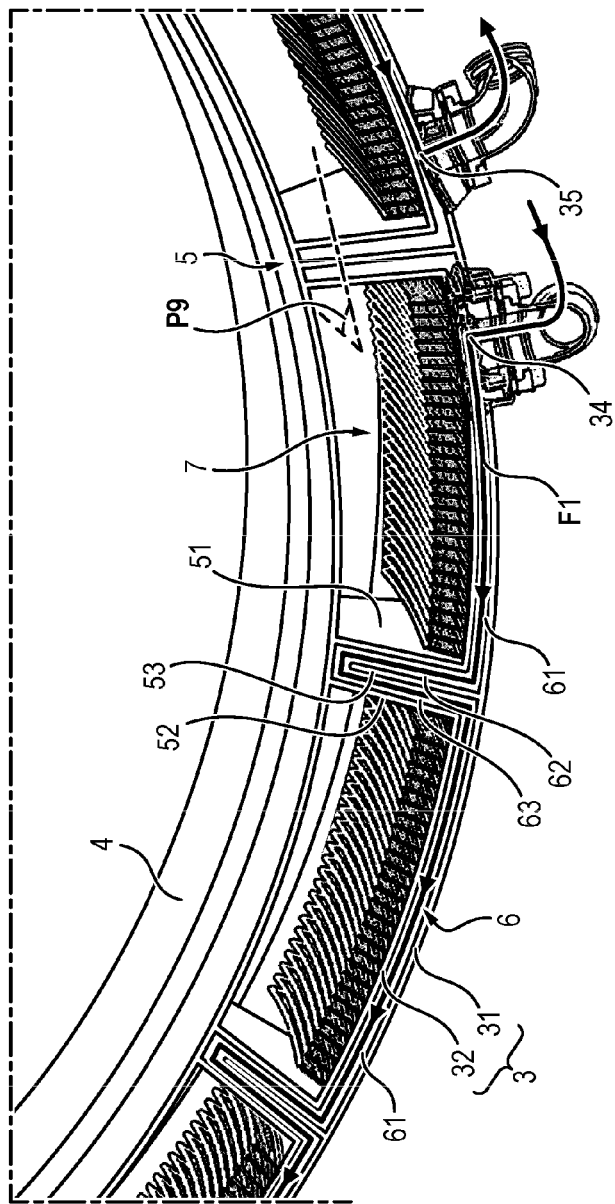
FIG. 4 is a detail view of the lower part of FIG. 3.

Furthermore, and as can be seen more clearly in FIGS. 3 and 4, the heat exchanger 2 in accordance with the invention comprises a circuit 6 for circulating the fluid to be cooled.

Advantageously, the two rings 3 and 4, the OGV guide vanes 5 and the circuit 6 are integral, i.e. they are formed as a single part and preferably obtained by an additive manufacturing method, particularly a powder-bed laser fusion method.

As can be seen in FIG. 4, the outer ring 3 has a double wall, namely an outer wall 31 and an inner wall 32. These two walls are spaced a small distance apart from one another and together fashion (i.e form) a first annular space 61, inside which the fluid to be cooled can circulate and which constitutes a part of the circuit 6. These inner 32 and outer 31 walls meet upstream and downstream of the exchanger (with respect to the direction of flow of the air flow inside the turbomachine), such as to laterally enclose the first space 61.

Figure 6:
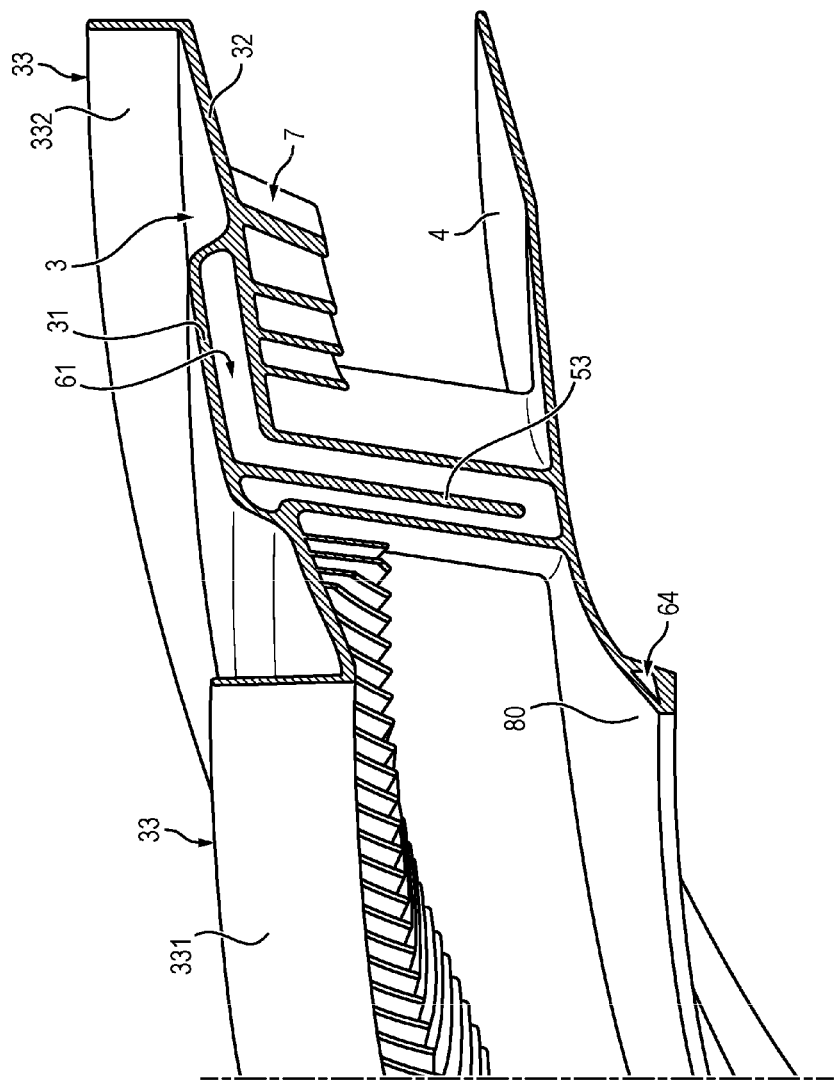
FIG. 6 is a section view, partly axial, of the upper part of the exchanger of FIG. 2.
Figure 8:
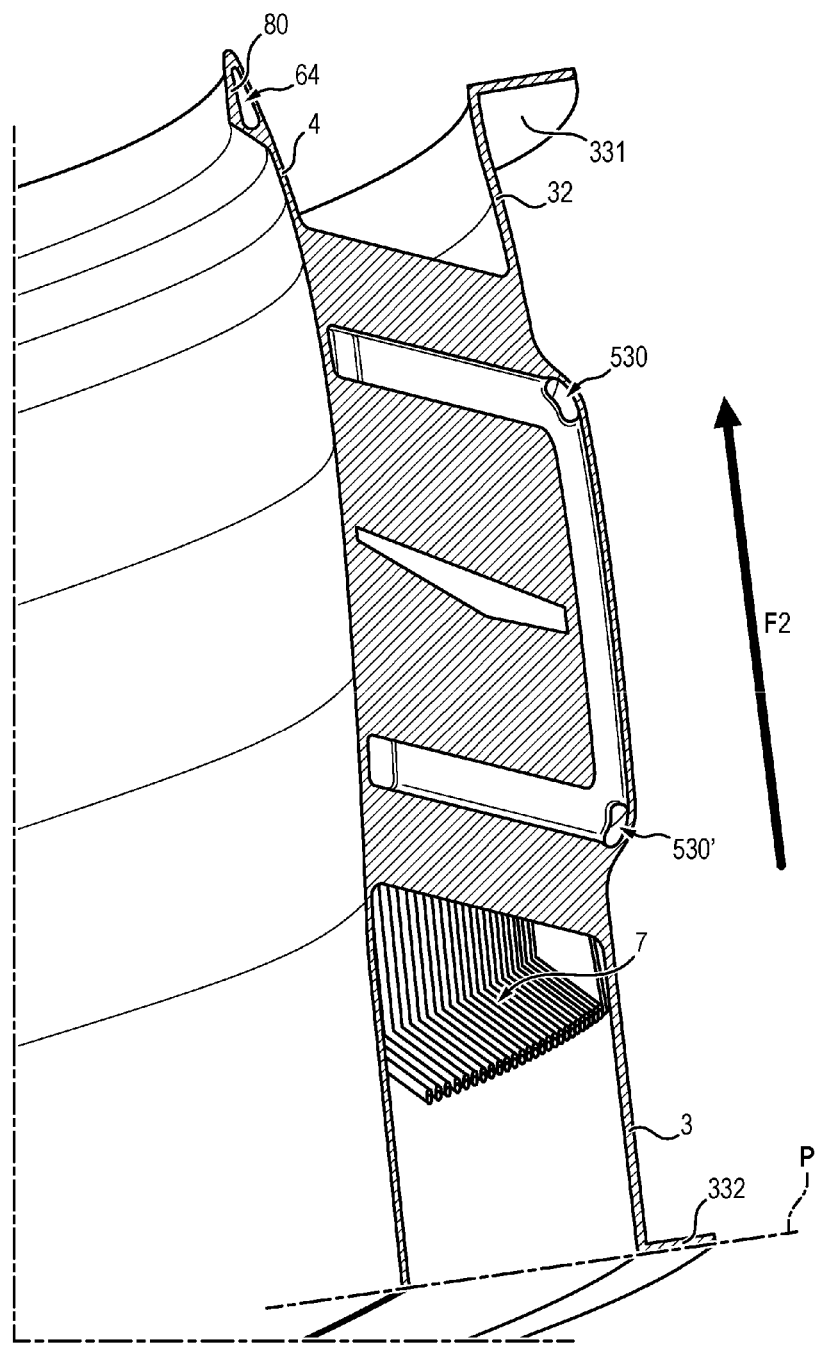
FIG. 8 is an axial section view of the upper part of the heat exchanger taken along the section plane embodied by the reference P8 in FIG. 2.

As can be seen more clearly in FIGS. 6 and 8, the outer wall 31 can be less wide than the inner wall 32, such that the space 61 is formed only over a part of the width of the exchanger 2, (the width being measured along the axial direction of the exchanger).

Preferably, and as can be seen in FIG. 6, both ends 33 of the outer ring 3 are curved outward, so as to form an upstream flange 331 and a downstream flange 332 respectively. These two flanges allow the attachment of the heat exchanger 2 to the outer secondary flow casing of the turbomachine (for example the casing 18 in FIG. 1).

Figure 7:
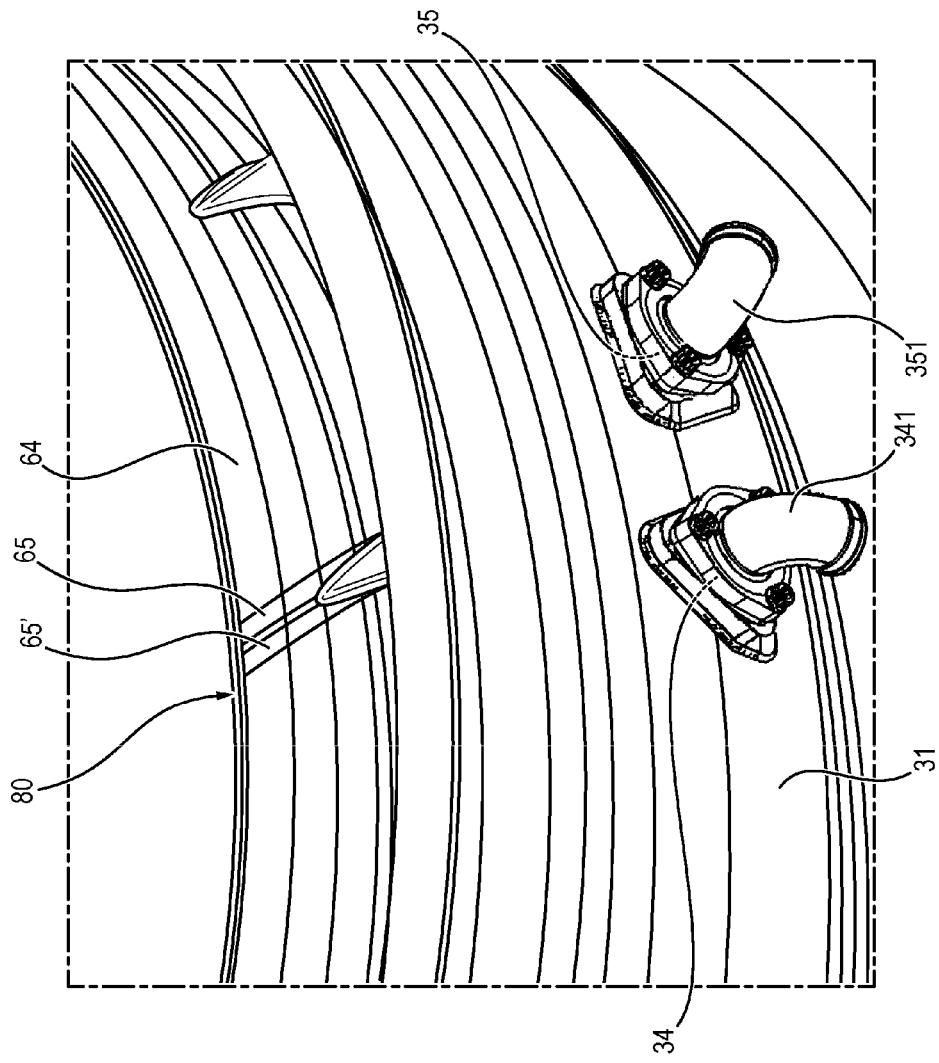
FIG. 7 is a perspective view of the lower part of the exchanger.

Furthermore, as can be seen in FIG. 7, the outer wall 31 is traversed by an inlet orifice 34 and an outlet orifice 35 which open onto the inside of the space 61 of the circuit 6. Two elbow unions 341, respectively 351 can be connected to said outlet orifices 34, 35. They may optionally be integral with the rest of the exchanger but this is not compulsory.

Preferably, and as can be seen more clearly in FIG. 4, the inlet 34 and outlet 35 orifices are fashioned on either side of an OGV guide vane 5 along a circumferential direction of the exchanger.

The structure of the OGV vanes 5 will now be described in more detail.

At least one OGV vane 5 of the exchanger 2 and preferably all the OGV vanes, comprise two partitions, respectively known as the "first partition" 51 and "second partition" 52. Each partition 51, 52, connects the inner wall 32 of the outer ring 3 to the inner ring 4.

Figure 5:
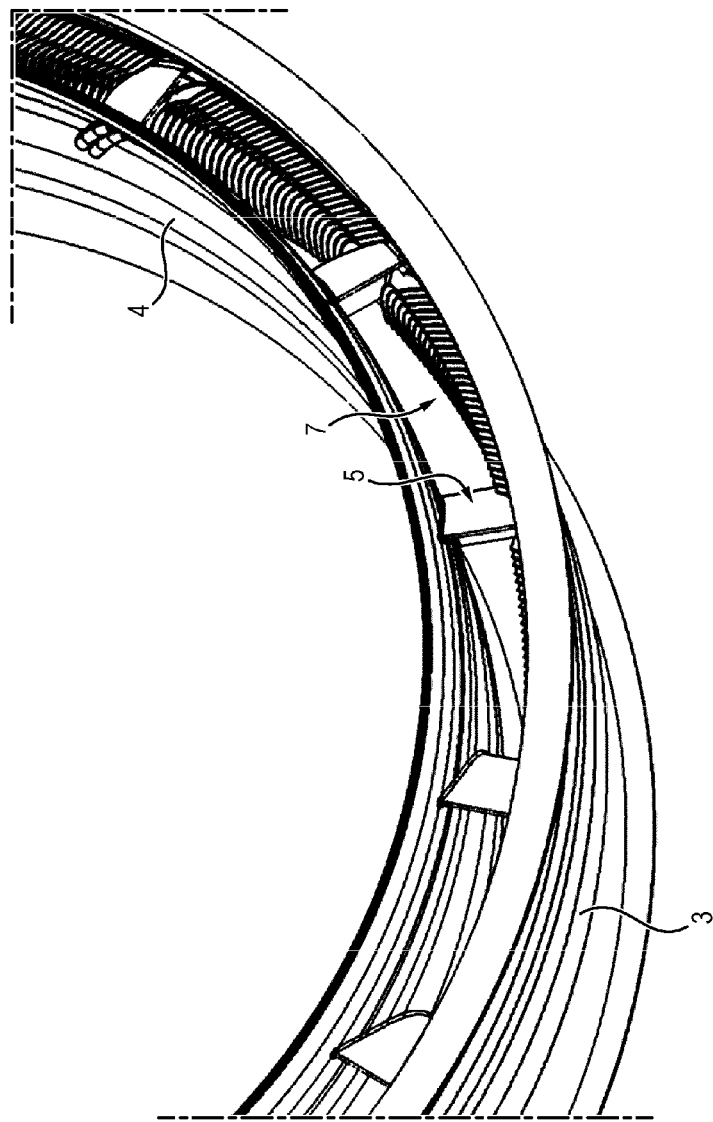
FIG. 5 is a detail view of the lower part of the exchanger of FIG. 2.
Figure 9:
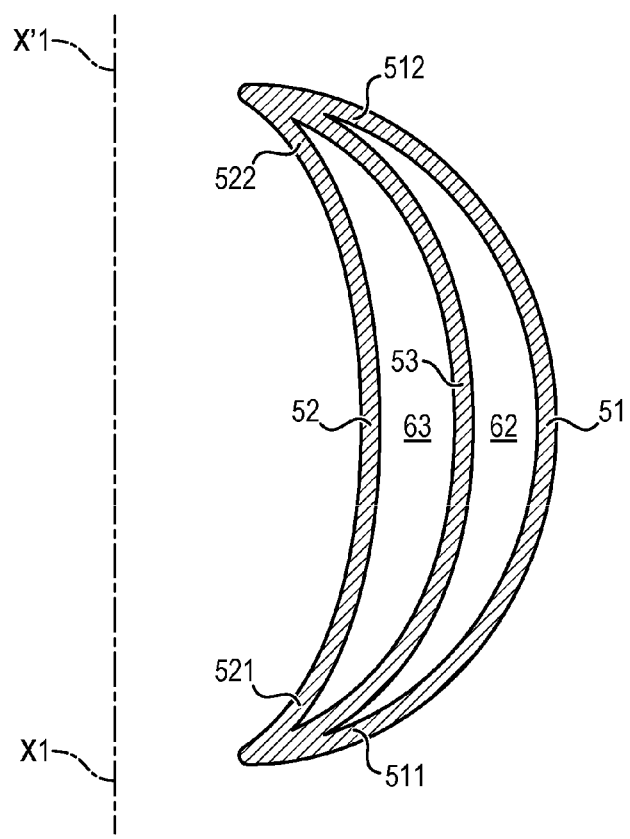
FIG. 9 is a section view of an OGV guide vane taken along the section plane embodied by the indication P9 in FIG. 4.
Figure 10:
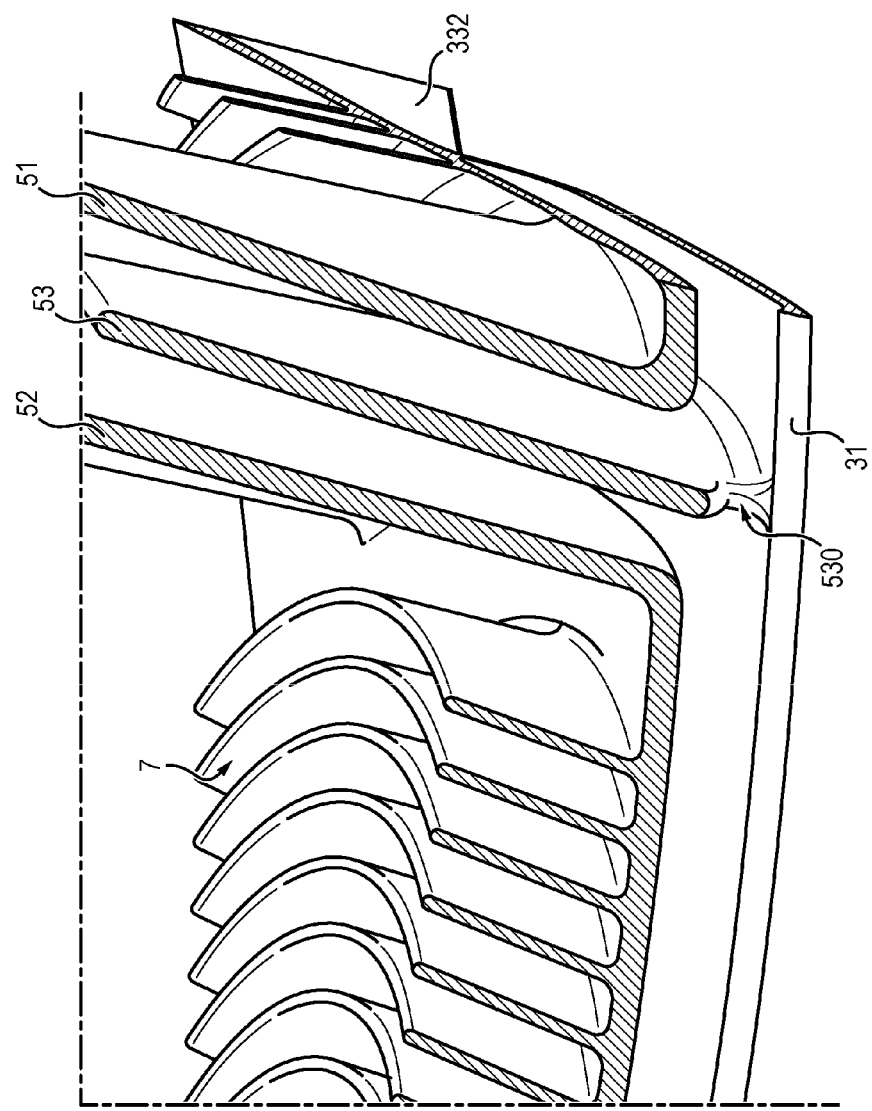
FIG. 10 is a transverse section view of the exchanger, taken along the plane embodied by the indication P10 in FIG. 2.

Preferably, and as can be seen more clearly in FIGS. 5 and 9, the first and second partitions 51, 52 are curved with respect to the axial direction X1-X'1 of the exchanger to guide the secondary air flow circulating between the inner ring 4 and the outer ring 3 and straighten it after it has passed through the fan 11.

The first partition 51 has an upstream end 511 and a downstream end 512 and the second partition 52, an upstream end 521 and a downstream end 522 (with respect to the direction of flow of the secondary air).

The two upstream ends 511, 521 meet and the two downstream ends 512, 522 also so as to enclose the space between the two partitions 51, 52.

Preferably, an intermediate separator 53 is disposed between the first partition 51 and the second partition 52. It extends radially toward the inside of the exchanger, from the outer wall 31 of the outer ring 3 and over a height less than that of the first and second partitions 51 and 52, such that it is not in contact with the inner ring 4. This separator 53 is also curved in the same direction and with the same radius of curvature as the partitions 51 and 52 if these latters are thus.

The separator 53 extends from the junction point of the two upstream ends 511, 521 of the partitions 51, 52 all the way to the junction point of their two downstream ends 512, 522.

The intermediate separator 53 thus plays the role of chicane and delimits with the first partition 51, a second space 62, which is in fluid communication with a part of the first space 61 located upstream of the OGV guide vane 5 inside which this intermediate separator 53 is disposed. The separator 53 also delimits with the second partition 52, a third space 63, which is found in fluid communication with the part of the first space 61 located downstream of the OGV guide vane 5 inside which this intermediate separator 53 is disposed. The concept of upstream and downstream is here applied with respect to the direction of circulation of the fluid to be cooled in the circulating circuit 6. The second space 62 and the third space 63 intercommunicate and constitute a part of the circuit 6.

The trajectory of circulation of the fluid to be cooled is represented in FIG. 4 by the arrow F1. The hot fluid enters the inlet orifice 34, circulates in the first space 61, engages radially inward in the second space 62, circumvents the separator 53, engages radially outward in the third space 63 and enters into the next portion of the first space 61. This circulation continues until the flow has gone around the whole circumference of the outer ring 3 and goes back out through the outlet orifice 35 after having been cooled.

The outer ring 3 and the OGV guide vanes 5 thus offer a large surface for exchanging heat between the secondary flow and the fluid.

Advantageously, the heat exchanger 2 also comprises a plurality of cooling tabs 7 which radially protrude from the inner wall 32 of the outer ring 3, in the direction of the inner ring 4. These tabs 7 are distributed over at least one portion of the circumference of said inner wall 31 between the OGV guide vanes 5.

The height of these tabs 7 is less than that of the OGV guide vanes 5, such that they do not touch the inner ring 4. Preferably, these tabs 7 are also integral with the inner wall 32 of the outer ring 3.

Preferably, and can be seen more clearly in FIG. 5, the cooling tabs 7 are also curved with respect to the axial direction, in the same direction and with the same radius of curvature as the OGV guide vanes 5, such that they also follow the contour thereof. These cooling tabs 7 increase the contact surface of the inner wall 32 with the air of the secondary flow.

Advantageously, and as can be seen on FIG. 8, the heat exchanger 2 also comprises a fairing 80 for annular separation of the primary and secondary air flows. This fairing forms a single part with the upstream end of the inner ring 4.

Advantageously, the fairing 80 is hollow such that it delimits a fourth space 64 which constitutes a part of the fluid-circulating circuit 6. This annular fourth space 64 extends over the entire circumference of the inner ring 4 of the exchanger 2.

As can be seen in FIGS. 2 and 7, an additional outward duct 65 and an additional return duct 65' are fashioned between this fourth space 64 and the first space 61, so as to put these two spaces in fluid communication. Preferably, these additional ducts 65, 65' open into the OGV guide vane 5 located beside the two inlet 34 and outlet 35 orifices of the fluid to be cooled (for example oil) or between them.

In this case, the fluid entering the fourth space 64 in the hot state serves mainly for the de-icing of the fairing 80, by allowing it to be heated.

As explained previously, the whole air/fluid heat exchanger 2 is preferably integral (monobloc) and is preferably obtained by additive manufacturing by powder-bed laser fusion.

To do this, the heat exchanger 2 is manufactured, layer after layer, based on a horizontal backing P, along a vertical direction of manufacturing (represented by the arrow F2 in FIG. 8).

Preferably and in order to use as few backing components as possible, the heat exchanger 2 is manufactured starting with its downstream end (on the side of the downstream flange 332) all the way to its upstream end.

Note that if one chooses to embody an outer ring 3 that is virtually cylindrical and therefore virtually perpendicular to the backing plane P and tabs 7 forming a maximum angle of 45° with respect to the vertical, it is possible to manufacture the exchanger 2 while limiting the number of backings. Only the OGV guide vanes 5 need supporting during manufacturing, which considerably simplifies the manufacturing process.

The exchanger could also be manufactured in the other direction (from upstream to downstream), but the fairing 80 protruding with respect to the upstream flange 331, it would then be necessary to support this latter or place it in the same plane as the forward fairing 80.

When the exchanger 2 is printed by the aforementioned additive manufacturing technique, there remains, within certain cavities (which form the circulating duct 6), powder which has not been hardened by the passing of the laser beam. It is therefore important to be able to depowder the manufactured part, and to empty these cavities. It is therefore necessary to ensure that powder can leave the exchanger 2 during the depowdering process.

To do this, advantageously, provision has been made for a first small hole 530, the so-called "depowdering hole" through the intermediate separator 53, at the level of the junction point of this intermediate separator 53 with the outer wall 31 of the outer ring 3 and the respective upstream ends 511, 521 of the first partition 51 and of the second partition 52, so that the powder can leave.

Similarly and advantageously, provision is also made for a second depowdering hole 530' in the intermediate separator 53, at the level of the junction point of this intermediate separator 53 with the outer wall 31 of the outer ring 3 and the respective upstream ends 512, 522 of the first partition 51 and the second partition 52.

Preferably, there are two holes 530, 530' at the level of each OGV guide vane 5.

After manufacturing, the heat exchanger 2 is shaken and turned over so that the powder can descend to the bottom of each OGV guide vane 5 then leave through the inlet 34 and outlet 35 orifices.

Note that when the exchanger is operational, the oil will take the same path as the powder during the depowdering. There is a part of the oil that will go straight to the place of the separation 53 and a part that will circumvent the separation. The holes 530, 530' do not open onto the outer wall of the heat exchanger. There is therefore no risk of leakage.

Figure 1:
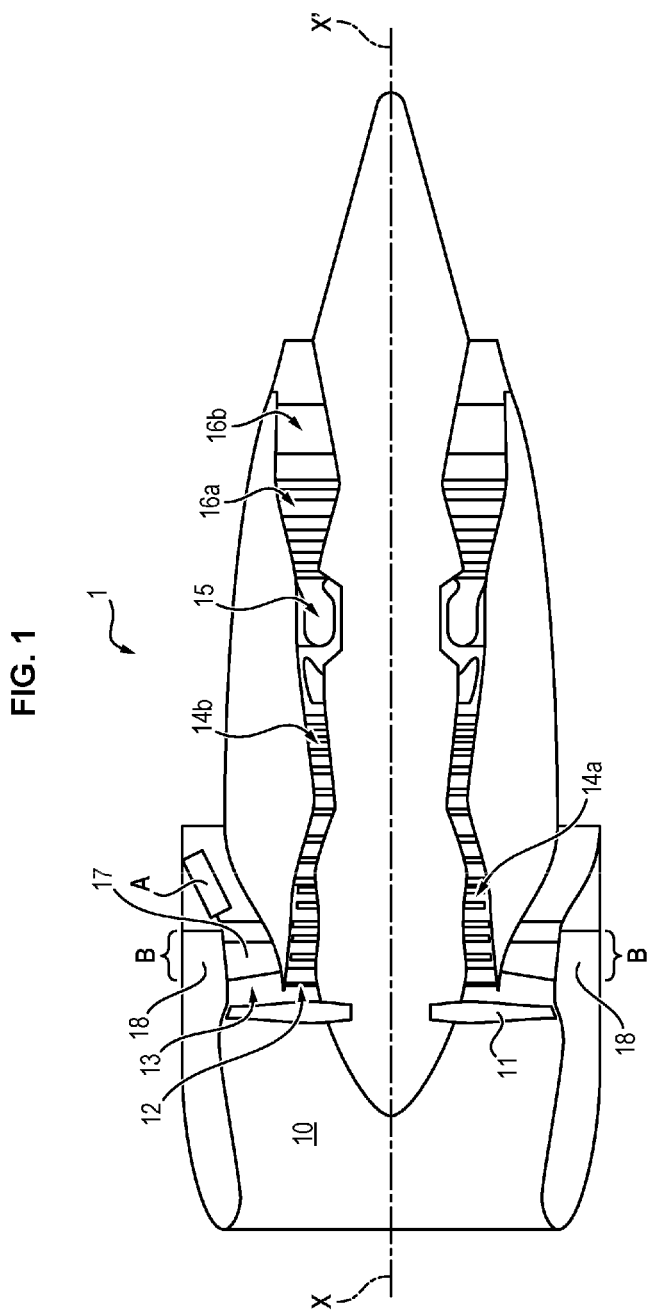
FIG. 1 is an axial section view of a bypass turbomachine of the prior art.

The heat exchanger 2 can then be attached in a turbomachine, as represented in FIG. 1 instead and in place of a section of the outer casing 18 and of the vanes 17 particularly using the upstream 331 and downstream 332 flanges.

The invention claimed is:

1. A secondary air/fluid heat exchanger for a bypass turbomachine, wherein the exchanger comprises:
    an outer ring, annular, with an inner wall and an outer wall,
    an inner ring, annular, concentric with the outer ring,
    a series of outlet guide vanes (OGV) connecting said outer ring to said inner ring,
    and a circuit for circulating a fluid,
    wherein the two rings delimit a secondary air path, wherein the circuit for circulating the fluid is formed in a thickness of said outer ring between the inner wall and the outer wall of the outer ring and in a thickness of at least one OGV guide vane of the series of OGV guide vanes, the circuit for circulating the fluid opening at both ends into an inlet orifice and into an outlet orifice, formed through the outer wall of the outer ring on either side of the at least one OGV guide vane along circumferential direction of the heat exchanger, and wherein the two rings, the OGV guide vanes and the circuit for circulating the fluid are integral, the heat exchange taking place between the fluid and a secondary air circulating in the secondary air path.

2. The heat exchanger as claimed in claim 1, wherein the exchanger comprises a plurality of cooling tabs which protrude from the inner wall of the outer ring in the direction of the inner ring, over only a part of the distance between this inner wall and the inner ring, these cooling tabs being disposed over at least a portion of the circumference of said inner wall, between the OGV guide vanes and in that said wherein the cooling tabs are integral with said inner wall of the outer ring.

3. The heat exchanger as claimed in claim 1, wherein at least one of said OGV guide vanes has a first partition and a second partition, an upstream end of the first partition meeting an upstream end of the second partition and a downstream end of the first partition meeting a downstream end of the second partition, wherein an intermediate separator protrudes between the first partition and the second partition from the outer wall of the outer ring, this intermediate separator extending from the respective upstream ends of the first partition and of the second partition all the way to the respective downstream ends of the first partition and of the second partition and over a height less than that of the first partition and of the second partition, in such a way as to form a chicane which makes it possible to guide the fluid circulating in the circuit for circulating the fluid from a first space located between the inner wall and the outer wall of the outer ring, upstream of said OGV guide vane, toward a second space fashioned between the first partition, and the intermediate separator, then toward a third space fashioned between the intermediate separator and the second partition and finally toward another part of the first space located between the inner wall and the outer wall of the outer ring, downstream of this same OGV guide vane, with respect to the direction of circulation of the fluid in said circuit for circulating the fluid and wherein this intermediate separator is integral with the outer wall of the outer ring.

4. The heat exchanger as claimed in claim 3, wherein the first partition and the second partition of the OGV guide vanes and the intermediate separator are curved with respect to the axial direction of the exchanger.

5. The heat exchanger as claimed in claim 4, wherein the exchanger comprises a plurality of cooling tabs which protrude from the inner wall of the outer ring in the direction of the inner ring, over only a part of the distance between this inner wall and the inner ring, these cooling tabs being disposed over at least a portion of the circumference of said inner wall, between the OGV guide vanes, wherein the cooling tabs are integral with said inner wall of the outer ring and wherein the cooling tabs are curved in the axial direction according to the same profile as the first partition and as the second partition of the OGV guide vanes.

6. The heat exchanger as claimed in claim 3, wherein the exchanger comprises at least a first depowdering hole fashioned in the intermediate separator at the level of the junction point of this intermediate separator with the outer wall of the outer ring and the respective upstream ends of the first partition and of the second partition of the OGV guide vane and at least a second depowdering hole fashioned in the intermediate separator at the level of the junction point of this intermediate separator with the outer wall of the outer ring and the respective downstream ends of the first partition and of the second partition of the OGV guide vane.

7. The heat exchanger as claimed in claim 1, wherein the exchanger comprises an annular forward fairing, integral with a circular upstream end of the inner ring and intended to separate the secondary air flow and a primary air flow circulating in said bypass turbomachine and wherein said forward fairing is hollow and delimits a fourth space constituting a portion of the circuit for circulating the fluid.

8. The heat exchanger as claimed in claim 1, wherein an upstream end and a downstream end of the outer ring are folded back toward an outside of the exchanger in such a way as to form an upstream attachment flange and a downstream attachment flange.

9. The heat exchanger as claimed in claim 1, wherein the fluid is lubrication oil.

10. A bypass turbomachine, wherein it comprises a secondary air/fluid heat exchanger as claimed in claim 1, in that the outer ring and the inner ring of this heat exchanger are respectively attached to an outer casing and to an inner casing of said turbomachine which together delimit the secondary flow path of said bypass turbomachine and wherein the inlet orifice and the outlet orifice of the circuit for circulating the fluid are connected to a source of fluid to be cooled of said turbomachine.

11. A method for manufacturing the secondary air/fluid heat exchanger as claimed in claim 1, wherein this secondary air/fluid heat exchanger is manufactured by additive manufacturing by powder-bed laser fusion.

\* \* \* \* \*